Patented Aug. 20, 1935

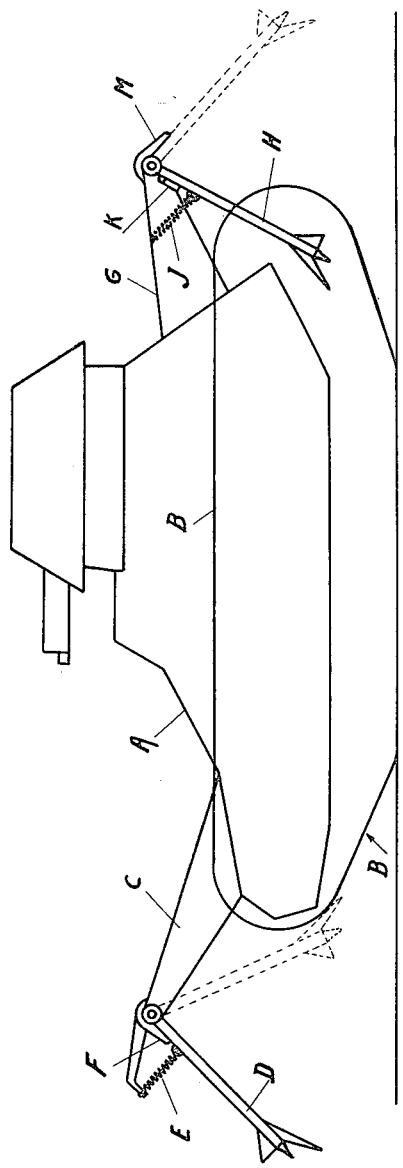

2,012,090

UNITED STATES PATENT OFFICE 2,012,090

TRENCH CROSSING DEVICE FOR VEHICLES

Nicholas Straussler, London, England, assignor, by mesne assignments, to Eclipse Aviation Corporation, East Orange, N. J., a corporation of New Jersey Application July 1, 1932, Serial No. 620,513 In Great Britain July 8, 1931

12 Claims. (Cl. 280—150)

This invention relates to trench crossing devices for vehicles either of the wheel type or of the track-laying type, its object being to enable a vehicle to cross a trench of a greater width than would otherwise be practicable.

According to the invention a pivoted leg or crutch is attached to the vehicle at one end or at each end thereof in such a position that it is normally clear of the ground and inoperative, but upon the vehicle tilting or pitching longitudinally in passing over a trench, the said leg engages the ground adjacent the edge of the trench, and thus provides a support extending beyond the wheel base or track base of the vehicle, the leg then rocking on its pivot until the said base recovers a position in which it adequately supports the centre of gravity of the vehicle. In the case of a vehicle in which the centre of gravity is far back or far forward in the vehicle a single pivoted leg at one end of the vehicle may suffice, but it will usually be preferable to employ such a leg at each end of the vehicle, the legs coming into action successively and not simultaneously.

In order that the said invention may be clearly understood and readily carried into effect, the same will now be described more fully with reference to the accompanying drawing or diagram illustrating an exemplification of the invention. A indicates the vehicle body, which has an endless track B. On a bracket C at the front of the vehicle is pivoted a leg D, the free end of which forms a spade or claws as seen in the drawing. A spring E in tension normally holds the leg D in the forwardly inclined position shown in full lines, abutting against the stop F. On another bracket G at the rear of the vehicle is pivoted the rear leg H, which a spring J normally holds against a stop K on the bracket G. The pivots of the legs D and H are as high above the normal ground level and as far forward and backward respectively as it is practicable to arrange them.

The vehicle in crossing a trench proceeds until the centre of gravity of the whole vehicle passes the proximate edge of the trench, when the vehicle begins to pitch forward, but if this movement brings the projecting end of the leg D into engagement with the remoter edge of the trench while the rear end of the track B remains in driving contact with the ground, the advance of the vehicle continues, the bracket C advances till the leg D takes up the position shown in dotted lines, slightly raising the front of the vehicle till the front of the track B begins to drive the vehicle and the leg D is lifted out of action.

When the rear of the track B reaches the trench and the vehicle would tend to tip or fall back into the trench, the leg H is forced into the ground and swings about its pivot into the position indicated in dotted lines, in which it abuts against the stop M on the extremity of the bracket G, thus supporting the vehicle until its centre of gravity is beyond the remoter side of the trench. The leg H trailing behind the vehicle is returned by the spring J to the position shown in full lines when the main portion of the track B is again on the ground.

In a vehicle of small size an increase of four or five feet in trench crossing capacity is thus obtainable; for example a vehicle of eight feet wheel base can cross a trench eight feet wide. With a longer wheel base and more than four wheels idle or bogey wheels can be used in addition to the driving wheels. As only one leg or crutch is at any time co-operating with the wheels or the endless track in supporting the weight of the vehicle, a "three point" effective base is obtained, the leg forming one point and the right and left hand wheels or the right and left hand members of the endless track forming the other two points.

What I claim is:

1. In a vehicle of the class described a body, a bracket fixed to the body and extending forwardly of and beyond the same, a leg pivoted to the forward end of the bracket and operative on pitching of the body to form a support therefor, said leg being oscillatable about a vertical line extending from the pivotal axis to the ground.

2. In a vehicle of the class described a body, a pair of brackets fixed to the body one of which extends forwardly and the other rearwardly of the body, a front leg pivoted to the forward end of the forward bracket, a rear leg pivoted to the rearward end of the rear bracket, said legs positioned so as to become operative only on pitching and nosing up respectively of the body, and said legs being oscillatable about vertical lines extending from their pivotal axes to the ground.

3. In a trench crossing device, a body, a front and a rear leg pivoted to the body, a stop on the body at each end thereof for limiting movement of each leg, the forward stop being arranged to limit forward inclination and the rear stop being arranged to limit rearward inclination of the leg, spring means for holding the forward leg against its stop, and spring means for urging the rear leg away from its stop.

4. In a trench crossing device, a body, a front and a rear leg pivoted to the body, a stop on the body at each end thereof for limiting movement of each leg, the forward stop being arranged to limit forward inclination and the rear stop being arranged to limit rearward inclination of the leg, spring means for holding the forward leg against its stop, and spring means for urging the rear leg away from its stop, each of said legs having its free end adapted to frictionally engage the trench wall upon contact of the leg with the wall for temporarily supporting the body.

5. In a trench crossing device for a vehicle having an endless chain tread, a body, a leg pivoted to the body forward of the endless chain, a stop for said leg adapted to hold said leg inclined forwardly at an acute angle with the ground while the vehicle is horizontal, a spring for holding the leg against the stop, a leg pivoted to the body rearwardly of the endless chain, means for limiting forward inclination of the rear leg, a stop for limiting rearward inclination of the rear leg to a position wherein the leg will form an acute angle with the ground while the vehicle is horizontal, and a spring for holding the rear leg in a forwardly inclined position.

6. In a trench crossing device for a vehicle having an endless chain tread, a body, a leg pivoted to the body forward of the endless chain, a stop for said leg adapted to hold said leg inclined forwardly at an acute angle with the ground while the vehicle is horizontal, a spring for holding the leg against the stop, a leg pivoted to the body rearwardly of the endless chain, means for limiting forward inclination of the rear leg, a stop for limiting rearward inclination of the rear leg to a position wherein the leg will form an acute angle with the ground while the vehicle is horizontal, and a spring for holding the rear leg in a forwardly inclined position.

7. In a trench crossing device, a body, a bracket extending forwardly of the body, a bracket extending rearwardly of the body, a trench engaging leg pivoted to the forward end of the forward bracket, a trench engaging leg pivoted to the rearward end of the rearward bracket, a stop on each bracket for limiting movement of each leg, the forward bracket stop being arranged to limit forward inclination of the front leg, the rearward bracket stop being arranged to limit rearward inclination of the rear leg, spring means for holding the forward leg against its stop, spring means for urging the rear leg away from its stop, and each of said legs having its free end adapted to frictionally engage the trench wall upon contact of the leg with the wall for temporarily supporting the body.

8. In a trench crossing device for a vehicle having an endless chain tread forming a loop, a trench engaging leg pivotally mounted to each end of the body and oscillatable about axes located a sufficient distance beyond the extremities of the loop to permit oscillation about vertical lines extending from the axes to the ground, and means for resiliently holding the legs in an inclined position with respect to the horizontal plane of the vehicle.

9. In a trench crossing device for a vehicle having an endless chain tread forming a loop, a trench engaging leg pivotally mounted to each end of the body and oscillatable about axes located beyond the extremities of the loop, and means for resiliently holding both legs in a forwardly inclined position with respect to the horizontal plane of the vehicle.

10. In a trench crossing device for a vehicle having an endless chain tread forming a loop, a trench engaging leg pivotally mounted to each end of the body and oscillatable about axes located above the loop and beyond the extremities thereof, and means for resiliently holding said legs in the same inclined direction with respect to the horizontal plane of the vehicle.

11. In a trench crossing device for a vehicle having an endless chain tread forming a loop, a trench engaging leg pivotally mounted to each end of the body and oscillatable about axes located above the loop and beyond the extremities thereof, a stop for limiting forward movement of the front leg, a pair of spaced stops for limiting movement in either direction of the rear leg, and spring means for holding each leg in a forwardly inclined position against its stop.

12. In a trench crossing device for a vehicle having an endless chain tread forming a loop, a trench engaging leg pivotally mounted to each end of the body and oscillatable about axes located above the loop and beyond the extremities thereof, and means for resiliently holding said legs in the same inclined direction with respect to the horizontal plane of the vehicle, each of said legs having a length less than the distance between its pivotal point and the ground when the vehicle is horizontal, whereby said legs may freely swing to their inclined position after displacement therefrom.

NICHOLAS STRAUSSLER.